UNITED STATES PATENT OFFICE.

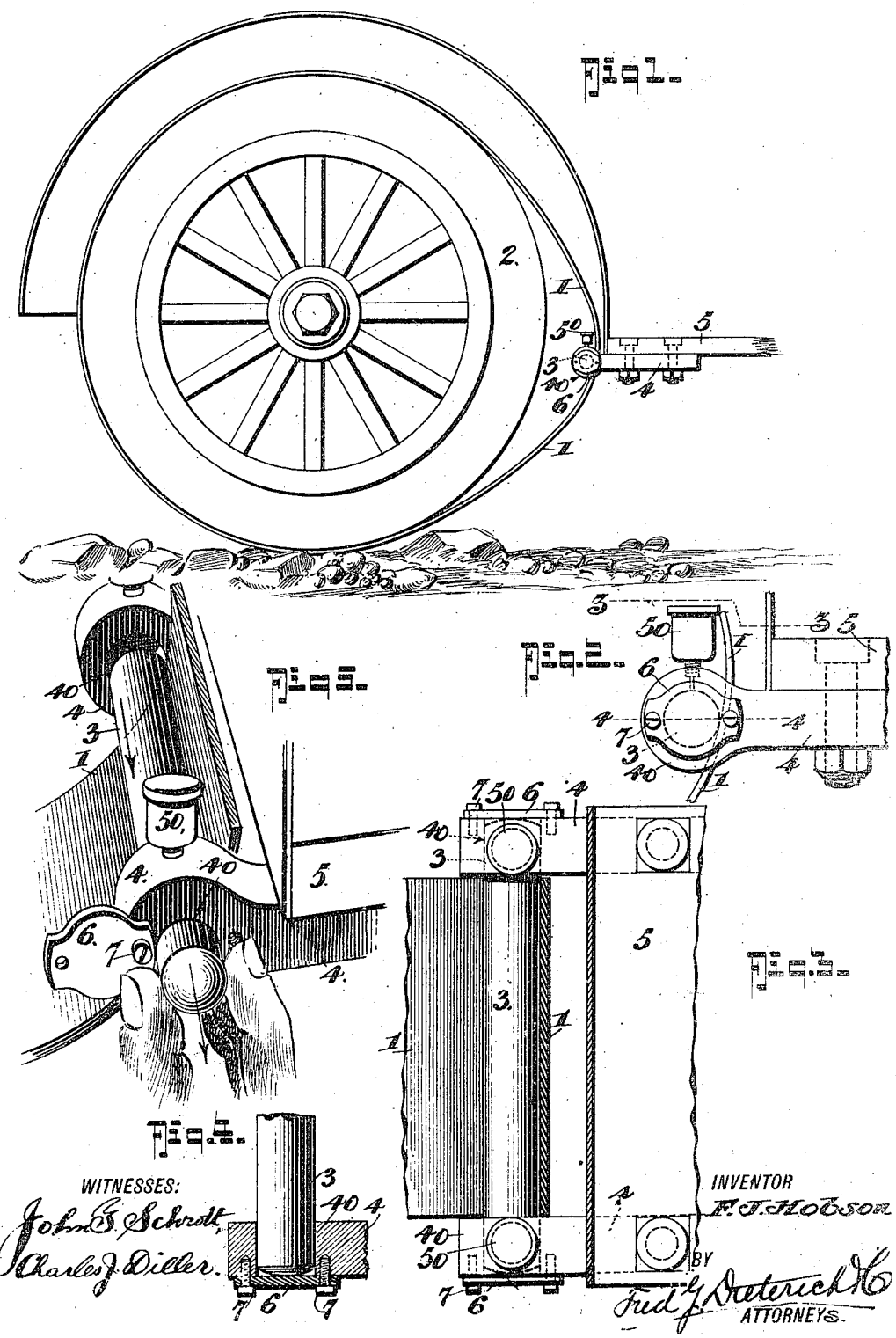

FRANCIS J. HOBSON, OF PHOENIX, ARIZONA.

TRACTOR ATTACHMENT FOR MOTOR-VEHICLES.

1,154,635.  Specification of Letters Patent.  Patented Sept. 28, 1915.

Application filed March 30, 1915. Serial No. 18,119.

*To all whom it may concern:*

Be it known that I, FRANCIS J. HOBSON, residing at Phoenix, in the county of Maricopa and State of Arizona, have invented certain new and useful Improvements in Tractor Attachments for Motor-Vehicles, of which the following is a specification.

My invention has for its object to provide an improved means, in the nature of an attachment for motor vehicles, for securing traction for automobile tires when running through sand or on soft or rocky roads.

Another object of my invention is to provide a means for the purpose stated of a simple and economical construction that can be quickly applied for use without the requirement of special tools or labor.

With objects in view that will hereinafter appear, my invention embodies the peculiar construction, and combination of parts hereinafter explained, specifically pointed out in the appended claims and illustrated in the accompanying drawings, in which:

Figure 1 is a side elevation of so much of a motor vehicle as is necessary to illustrate the application of my invention. Fig. 2 is an end elevation of the means for holding the endless belt or tractor attachment in the operation position. Fig. 3 is a horizontal section thereof taken on the line 3—3 of Fig. 2. Fig. 4 is a detail horizontal section of the same on the line 4—4 of Fig. 2. Fig. 5 is a detail perspective view that illustrates the endless belt holding roller and the manner of removably mounting it on the running board of the vehicle.

My traction attachment consists of an endless belt 1 of such size that it may be readily slipped onto the wheel 2 and over the holding member, in the nature of a roller 3 that is mounted in brackets 4—4, which project from the inner and outer edges of the running board 5 and in the direction of the wheel 1. The brackets 4 which are secured to the running board by the bolts, as shown, have bearings 40 with each of which communicates a grease cup 5, for lubricating the roller bearings. The roller 3 is endwise slidable through the bracket bearings so it may be readily removed from or placed in the said bearings, and to hold the roller within the bearings, cap plates 6 are secured on the outside of the said bearings, as is clearly shown in Figs. 3 and 4 of the drawings.

The endless belt, which may be of rubber or other suitable material, when not required for use, can be readily carried in the "tool box", and when the said belt has been in use, it can be readily removed by loosening one of the screws 7 of one of the end cap plates so the plate may be swung back as shown in Fig. 5, to allow for shoving the roller 3 endwise out of the bearings, and from engagement with the belt, it being understood that when the belt is removed, the roller is shoved back and held in place by securing the loose cap plate back over the end thereof.

By reason of providing an attachment as described, when the same is attached to the wheel, and the roller 3 in the manner shown, traction is obtained on the worst sandy roads, up-grades, soft roads and loose rocky roads, making passable roads that are impassable without my attachment. In addition to providing traction, my attachment protects tires from punctures, stone bruises and materially increases the mileage obtained with tires on ordinary roads.

What I claim is:

1. In a motor vehicle, the combination with the wheel, the running board and guide brackets on the said board that project therefrom in the direction of the wheel; of an idler roller endwise removably mounted in the said guides, means on the guides for locking the roller from endwise movement and an endless traction belt passing around the wheel and the said roller.

2. In a motor vehicle; the combination with a tractor wheel, the running board, and a pair of spaced guide brackets secured to the running board and projecting therefrom in the direction of the wheel, said brackets each having a transverse bearing aperture; of an idler roller journaled in the bearing apertures of the brackets and adapted for having endwise movement through the said brackets, and a traction belt that takes around the wheel and the said roller, and means comprising pivoted cap members on the brackets for closing the bearings to hold the idler roller against endwise movement.

FRANCIS J. HOBSON.

Witnesses:
O. E. SCHUPP,
PAUL RENAY INGLES.

Copies of this patent may be obtained for five cents each, by addressing the "Commissioner of Patents,"